United States Patent
Kim et al.

(10) Patent No.: US 9,615,338 B2
(45) Date of Patent: Apr. 4, 2017

(54) POWER HEADROOM REPORT METHOD AND APPARATUS OF UE

(75) Inventors: Soeng Hun Kim, Yongin-si (KR); Gert-Jan Van Lieshout, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 765 days.

(21) Appl. No.: 13/396,947

(22) Filed: Feb. 15, 2012

(65) Prior Publication Data

US 2012/0207112 A1    Aug. 16, 2012

Related U.S. Application Data

(60) Provisional application No. 61/442,985, filed on Feb. 15, 2011, provisional application No. 61/444,844, filed on Feb. 21, 2011, provisional application No. 61/471,872, filed on Apr. 5, 2011, provisional application No. 61/481,878, filed on May 3, 2011.

(51) Int. Cl.
| | |
|---|---|
| *H04W 52/36* | (2009.01) |
| *H04W 52/14* | (2009.01) |
| *H04W 52/54* | (2009.01) |
| *H04W 88/06* | (2009.01) |
| *H04W 88/10* | (2009.01) |
| *H04W 88/02* | (2009.01) |

(52) U.S. Cl.
CPC ....... *H04W 52/365* (2013.01); *H04W 52/146* (2013.01); *H04W 52/367* (2013.01); *H04W 52/54* (2013.01); *H04W 52/545* (2013.01); *H04W 88/02* (2013.01); *H04W 88/06* (2013.01); *H04W 88/10* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 9,210,671 B2* | 12/2015 | Bostrom | H04W 52/30 |
| 2008/0008152 A1 | 1/2008 | Lohr et al. | |
| 2008/0215948 A1 | 9/2008 | Pinheiro et al. | |
| 2009/0034487 A1 | 2/2009 | Lohr et al. | |

(Continued)

FOREIGN PATENT DOCUMENTS

| | | |
|---|---|---|
| CN | 101932087 A | 12/2010 |
| CN | 103119996 A | 5/2013 |

(Continued)

OTHER PUBLICATIONS

LG Electronics Inc. et al, "Correction to PHR functionality", 3GPP TSG-RAN2 Meeting #65, R2-091978, Athens, Greece, Feb. 9-13, 2009.

(Continued)

*Primary Examiner* — Hong Cho
(74) *Attorney, Agent, or Firm* — Jefferson IP Law, LLP

(57) ABSTRACT

An improved method and an apparatus for reporting Power Headroom (PH) of a UE are provided. The Power Headroom Report (PHR) method of the present invention includes determining whether to trigger PHR based on a change of Power Management Maximum Power Reduction (P-MPR) between two time points, generating, if PHR is determined to be triggered, Power Headroom, and reporting the Power Headroom information to a base station.

14 Claims, 11 Drawing Sheets

(56) References Cited

U.S. PATENT DOCUMENTS

| | | | |
|---|---|---|---|
| 2009/0191910 A1* | 7/2009 | Athalye et al. | 455/522 |
| 2010/0273515 A1* | 10/2010 | Fabien et al. | 455/509 |
| 2010/0316026 A1 | 12/2010 | Lee et al. | |
| 2011/0002284 A1 | 1/2011 | Talwar et al. | |
| 2011/0158117 A1* | 6/2011 | Ho | H04W 52/34 370/252 |
| 2011/0292874 A1* | 12/2011 | Ho | H04W 52/42 370/328 |
| 2011/0310760 A1* | 12/2011 | Wu | H04W 72/0413 370/252 |
| 2012/0083310 A1 | 4/2012 | Zhao et al. | |
| 2012/0127933 A1* | 5/2012 | Worrall | H04W 52/367 370/329 |
| 2012/0172079 A1* | 7/2012 | Baldemair | H04W 52/365 455/522 |
| 2012/0176923 A1* | 7/2012 | Hsu | H04W 52/243 370/252 |
| 2012/0178494 A1* | 7/2012 | Haim | H04W 52/365 455/522 |
| 2013/0121203 A1 | 5/2013 | Jung et al. | |
| 2013/0316758 A1 | 11/2013 | Uchino et al. | |
| 2016/0081045 A1 | 3/2016 | Bostrom et al. | |

FOREIGN PATENT DOCUMENTS

| | | |
|---|---|---|
| CN | 103141041 A | 6/2013 |
| JP | 2010-34612 A | 2/2010 |
| JP | 2011-508559 A | 3/2011 |
| JP | 2012-529841 A | 11/2012 |
| WO | 2011/150361 A1 | 12/2011 |
| WO | 2012/091651 A1 | 7/2012 |
| WO | 2012/108876 A1 | 8/2012 |
| WO | 2012/111676 A1 | 8/2012 |

OTHER PUBLICATIONS

Samsung, "PHR timer handling after handover", 3GPP TSG-RAN2 meeting #66, R2-093431, San Francisco, USA, May 4-8, 2009.

HT MMOBILE Inc., "Correction to PHR triggering", 3GPP TSG-WG2 Meeting #70, R2-102724, Montreal, Canada, May 10-14, 2010.

Qualcomm Incorporated, Power Management Based PHR Trigger, Change Request, 3GPP TSG-RAN2 Meeting #72bis, Dublin, Ireland, Jan. 17-21, 2011, R2-110177.

Ericsson et al., Adding a Power Management Indication in PHR, Change Request, 3GPP TSG-RAN2 Meeting #73, Taipei, Taiwan, Feb. 21-25, 2011, R2-110940.

Ericsson et al., Power Management Indication in PHR, 3GPP TSG-RAN WG2#73, Taipei, Taiwan, Feb. 21-25, 2011, Tdoc R2-110941.

Qualcomm Incorporated, Definition of Pcmax, c, 3GPP TSG-RAN4 #57AH, Austin, Texas, Jan. 17-21, 2010, R4-110567.

Alcatel-Lucent et al., Pcmax, c Signalling Optimisation, 3GPP TSG-RAN WG2 Meeting #72bis, Dublin, Ireland, Jan. 17-21, 2011, R2-110139.

Mediatek Inc., Rel-10 PHR for Non-CA UE, 3GPP TSG-RAN WG2 Meeting #72bis, Dublin, Ireland, Jan. 17-21, 2011, R2-110244.

Qualcomm et al., Clarifications on P-MPR PHR Trigger, Change Request, 3GPP TSG-RAN2 Meeting #74, Barcelona, Spain, May 9-13, 2011, R2-113557.

Qualcomm Incorporated et al., Power Management Based PHR Trigger, 3GPP TSG-RAN2 Meeting #72bis, Dublin, Ireland, Jan. 17-21, 2011, R2-110656.

3rd Generation Partnership Project; Technical Specification Group Radio Access Network, Evolved Universal Terrestrial Radio Access (E-UTRA), Physical Layer Procedures (Release 10), 3GPP TS 36.213, Dec. 2012, pp. 1-92, V10.0.1, 3GPP, Valbonne, France.

Interdigital, PHR Triggering for SAR, 3GPP TSG RAN WG2 #72-bis, R2-110220, Jan. 11, 2011, Dublin, Ireland.

Qualcomm Incorporated, PHR Trigger for Power Reduction Due to Power Management, 3GPP TSG-RAN2 Meeting #73, R2-110797, 36.321_CR0449 (REL10), Feb. 14, 2011, Taipei, Taiwan.

Motorola and MCC 160, Corrections to GCF1-14, WI-25 test case 7.1.6.2.10, 3GPP DRAFT, R5-070307, Jan. 29, 2007, Hong Kong, China.

Huawei et al., Consideration on DRX in eICIC scenario, 3GPP DRAFT, R2-111021, Feb. 14, 2011, XP050493546, Taipei.

Alcatel-Lucent et al, RRC signalling design for Almost Blank Subframe patterns, 3GPP DRAFT, R2-106451, Nov. 9, 2010, XP050492280, Jacksonville, USA.

Research in Motion UK Limited, UE power saving for eICIC, 3GPP DRAFT, R2-111233, Feb. 15, 2011, XP050493735, Taipei, Taiwan.

ZTE, Clarification of Timing Requirements for Activation and Deactivation of SCells in TDD mode, 3GPP DRAFT, R4-110871, Feb. 16, 2011, XP050500940, Taipei.

3rd Generation Partnership Project; Technical Specification Group Radio Access Network; Evolved Universal Terrestrial Radio Access (E-UTRA); Medium Access Control (MAC) protocol specification (Release10), 3GPP STANDARD, 3GPP TS 36.321 v10.0.0, Dec. 17, 2010.

Interdigital Communications, Report of Email discussion #26 on SCell Activation in LTE CA, 3GPP DRAFT, R2-111384, Feb. 18, 2011, XP050605673, Taipei, Taiwan.

Samsung, CSI reporting and SRS timing upon SCell activation/deactivation, 3GPP TSG-RAN1#63bis meeting R1-110069, the internet <URL:http://www.3gpp.org/ftp/tsg_ran/WG1_RL1/TSGR1_63b/Docs/R1-110069.zip> Jan. 21, 2011.

Qualcomm Incorporated, Supporting Multiple Timing Advance Groups, 3GPP TSG-RAN WG2 meeting#68bis—R2-100423, Jan. 18-22, 2010, Valencia, Spain.

E-mail rapporteur (NTT DOCOMO, INC.), CA support for multi-TA, 3GPP TSG-RAN2#69, R2-101567, internet <URL: http://www.3gpp.org/ftp/tsg_ran/WG2_RL2/TSGR2_69/Docs/R2-101567.zip>, Feb. 22-26, 2010, San Francisco, USA.

3rd Generation Partnership Project; Technical Specification Group Radio Access Network; Evolved Universal Terrestrial Radio Access (E-UTRA); Physical layer procedures (Release 10), 3GPP TS 36.213 v10.0.1, XP050462385, Dec. 28, 2010.

3rd Generation Partnership Project; Technical Specification Group Radio Access Network; Evolved Universal Terrestrial Radio Access (E-UTRA); Radio Resource Control (RRC); Protocol specification (Release 10), 3GPP TS 36.331 v10.0.0, Dec. 21, 2010.

3GPP TS 36.321 V10.1.0, Medium Access Control (MAC) protocol specification (Release 10), Mar. 31, 2011, Sophia Antipolis, France.

* cited by examiner

POWER HEADROOM REPORT METHOD AND APPARATUS OF UE

PRIORITY

This application claims the benefit under 35 U.S.C. §119 (e) of a U.S. Provisional application filed on Feb. 15, 2011 in the U.S. Patent and Trademark Office and assigned Ser. No. 61/442,985, and of a U.S. Provisional application filed on Feb. 21, 2011 in the U.S. Patent and Trademark Office and assigned Ser. No. 61/444,844, and of a U.S. Provisional application filed on Apr. 5, 2011 in the U.S. Patent and Trademark Office and assigned Ser. No. 61/471,872, and of a U.S. Provisional application filed on May 3, 2011 in the U.S. Patent and Trademark Office and assigned Ser. No. 61/481,878, the entire disclosures of which are hereby incorporated by reference.

BACKGROUND OF THE INVENTION

1. Field of the Invention

The present invention relates to a Power Headroom Report (PHR) method and apparatus of a User Equipment (UE). More particularly, the present invention relates to a method and apparatus for reporting Power Headroom (PH) of a UE efficiently.

2. Description of the Related Art

Mobile communication systems are developed to provide subscribers with voice communication services on the move. With the advance of technologies, the mobile communications have evolved so as to support high speed data communication services as well as the standard voice communication services.

Recently, as one of the next generation mobile communication systems, Long Term Evolution (LTE) is on the standardization by the 3rd Generation Partnership Project (3GPP). LTE is designed to provide for a downlink speed of up to 100 Mbps. In order to fulfill the requirements of the LTE systems, studies have been done in various aspects, including minimization of the number of involved nodes in the connections, and placing the radio protocol as close as possible to the radio channels.

In the meantime, unlike the standard voice service, most data services are allocated resources according to the amount of data to be transmitted and to the channel condition. Accordingly, in the wireless communication system such as cellular communication system, it is important to manage resource allocation based on the resource scheduled for data transmission, the channel condition, and the amount of data to be transmitted. This is the fact even in the LTE system, and even if the base station scheduler manages and assigns radio resources.

More recent studies are focused on the LTE-Advanced (LTE-A) for improving data rate with the adaptation of several new techniques. Carrier Aggregation (CA) is one of the most distinct features of LTE-A. Unlike communication systems according to related art that use single uplink and single downlink carriers per a User Equipment (UE), the Carrier Aggregation enables a UE to be scheduled on multiple carriers in both uplink and downlink. Accordingly, it is required for the eNB to configure the UE transmit power per uplink carrier efficiently and, as a consequence, it becomes more important for the UE to report maximum UE transmit power and Power Headroom (PH).

Meanwhile, LTE UEs are generally configured to be equipped with multiple system modems enabling operation in dual mode. This configuration allows the UE to simultaneously receive multiple services through two different systems. In such a situation, the UE is required to report the maximum transmit power and Power Headroom (PH) per system in order to improve scheduling reliability.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for reporting Power Headroom (PH) of the UE efficiently.

In accordance with an aspect of the present invention, a Power Headroom Report (PHR) method of a terminal is provided. The method includes determining whether to trigger a PHR based on a change of Power Management Maximum Power Reduction (P-MPR) between two time points, generating, if PHR is determined to be triggered, a Power Headroom (PH), and reporting the Power Headroom information to a base station.

In accordance with another aspect of the present invention, a Power Headroom Report (PHR) apparatus of a terminal is provided. The apparatus includes a transceiver for communicating with a base station, and a controller for determining whether to trigger a PHR based on a change of Power Management Maximum Power Reduction (P-MPR) between two time points, for generating, if PHR is determined to be triggered, a Power Headroom (PH), and for reporting the Power Headroom information to a base station.

In accordance with another aspect of the present invention, a non-transitory computer readable storage medium of a terminal storing a program for reporting a Power Headroom (PH) to a base station is provided. The program stored on the non-transitory computer readable storage medium comprises instructions to cause a computer to determine whether to trigger a PHR based on a change of Power Management Power Reduction (P-MPR) between two time points, generate, if the PHR is determined to be triggered, the Power Headroom, and report the Power Headroom to the base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
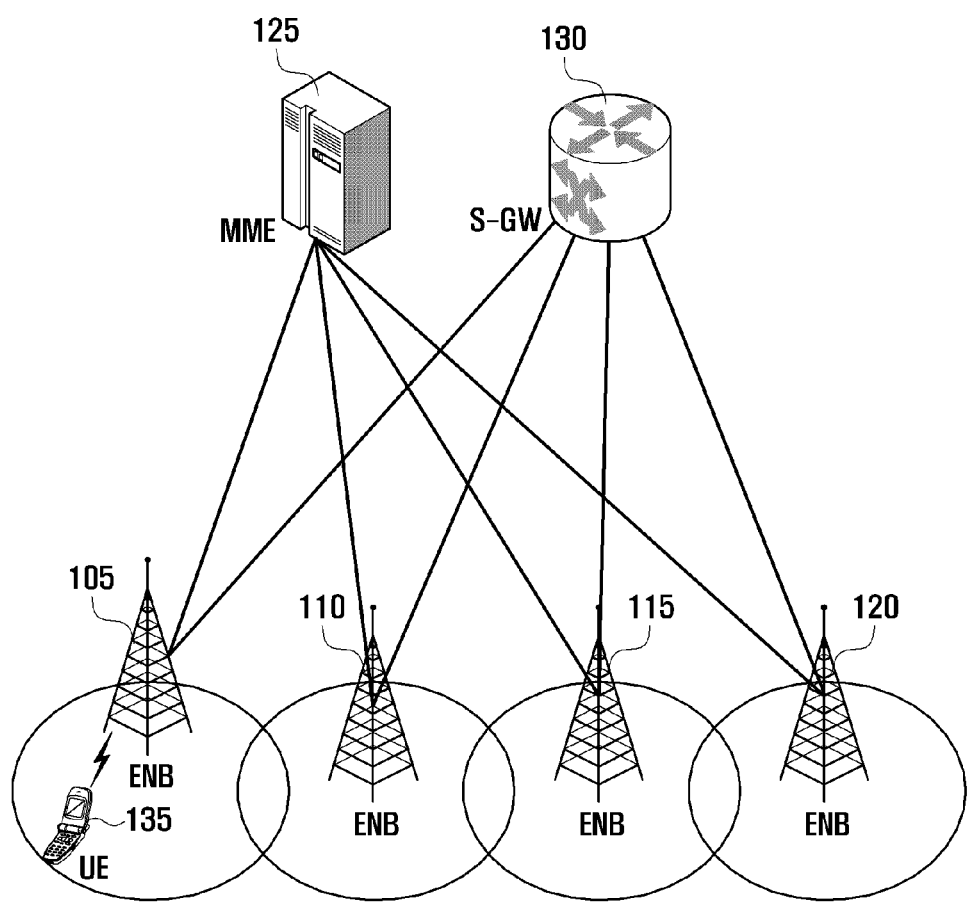
FIG. 1 is a diagram illustrating an architecture of a mobile communication system according to an exemplary embodiment of the present invention.
Figure 2:
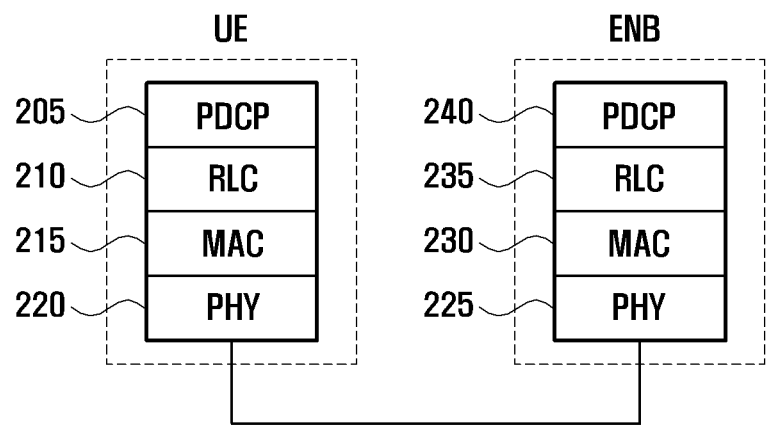
FIG. 2 is a diagram illustrating a protocol stack of a mobile communication system according to an exemplary embodiment of the present invention.
Figure 3:
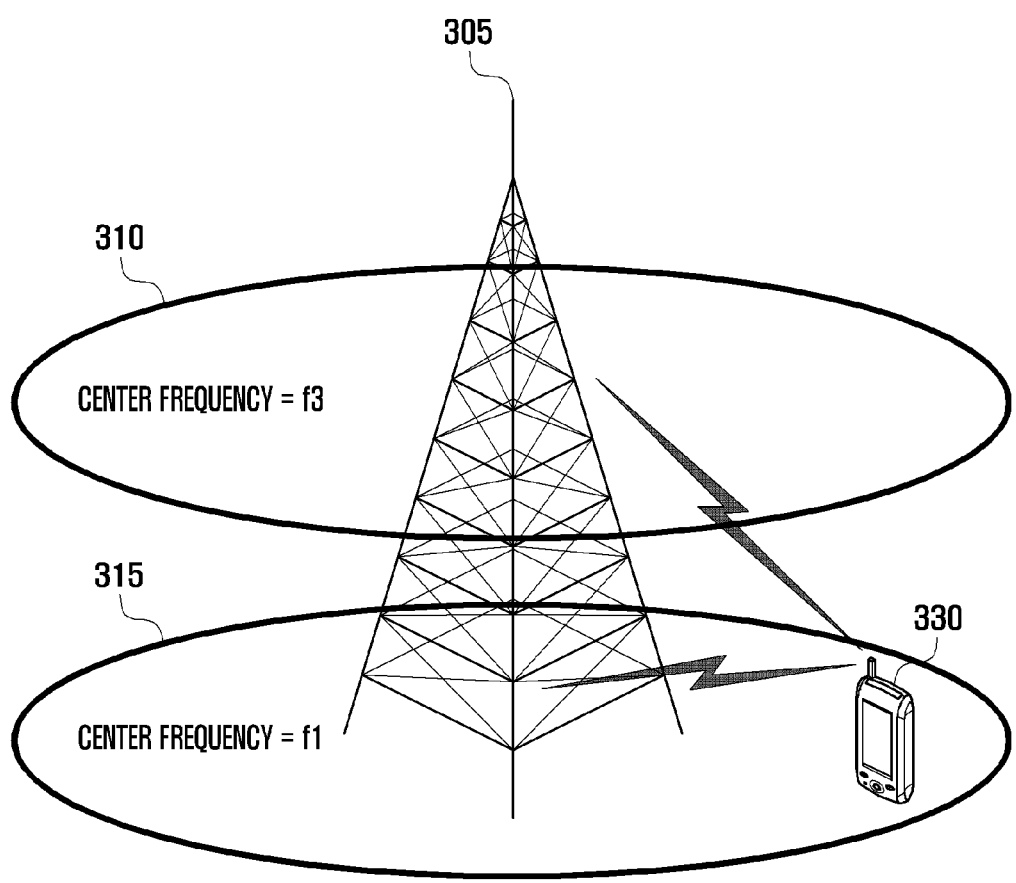
FIG. 3 is a diagram illustrating an exemplary situation of Carrier Aggregation in a mobile communication system according to an exemplary embodiment of the present invention.

Before explaining exemplary embodiments of the present invention, a description is made of to Long Term Evolution (LTE) mobile communication system with reference to FIGS. 1, 2, and 3.

FIG. 1 is a diagram illustrating an architecture of a mobile communication system according to an exemplary embodiment of the present invention.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (UE) 135 connects to an external network via eNBs 105, 110, 115, and 120, and the S-GW 130.

The eNBs 105, 110, 115, and 120 correspond to legacy node Bs of a Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel. Thus, there is a need for a device which is located in the eNB to schedule data based on the state information such as UE buffer conditions, Power Headroom state, and channel state. Typically, one eNB controls a plurality of cells. In order to secure a data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE.

S-GW 130 is an entity to provide data bearers so as to establish and release data bearers under the control of the MME 125. MME 125 is responsible for various control functions and is connected to a plurality of eNBs 105, 110, 115, and 120.

FIG. 2 is a diagram illustrating a protocol stack of a mobile communication system according to an exemplary embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression. The RLC 210 and 235 is responsible for segmenting the PDCP Protocol Data Unit (PDU) into segments of appropriate size for an Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer.

FIG. 3 is a diagram illustrating an exemplary situation of Carrier Aggregation in a mobile communication system according to an exemplary embodiment of the present invention.

Referring to FIG. 3, typically an eNB can use multiple carriers transmitted and received in different frequency bands. For example, the eNB 305 can be configured to use the carrier 315 with center frequency f1 and the carrier 310 with center frequency f3. If Carrier Aggregation is not supported, the UE 330 has to transmit/receive data using one of the carriers 310 and 315. However, the UE 330 having the Carrier Aggregation capability can transmit/receive data using both the carriers 310 and 315. The eNB can increase the amount of the resource to be allocated to the UE having the Carrier Aggregation capability in adaptation to the channel condition of the UE so as to improve the data rate of the UE.

If a cell is configured with one downlink carrier and one uplink carrier according to the related art, the Carrier Aggregation can be understood as though the UE communicates data via multiple cells. With the use of Carrier Aggregation, the maximum data rate increases in proportion to the number of aggregated carriers.

In the following description, the phrase "the UE receives data through a certain downlink carrier or transmits data through a certain uplink carrier" refers to transmission or receipt of data through control and data channels provided in a cell corresponding to center frequencies and frequency bands of the downlink and uplink carriers. In the following description, the Carrier Aggregation is expressed as a procedure of configuring a plurality of serving cells with the terms such as primary serving cell, secondary serving cell, and activated service cell. These terms are used with the meanings as specified in TS 36.331 and TS 36.321 released on December 2011, the entire disclosure of which is incorporated herein.

In LTE, the UE's available transmit power amount is referred to as Power Headroom (PH) which is defined as the difference between a configured maximum UE output power (PCMAX) and a transmit power currently being used by the UE. If a specific condition is satisfied, the UE reports PH to the eNB. The process of the UE reporting PH to the eNB is referred as a Power Headroom Report (PHR). In a method according to the related art, the PHR is triggered when pathloss variation is greater than a predetermined threshold value or when a PHR period arrives. The eNB can predict the channel state of the eNB based on the collected PH values to determine whether to allocate an additional radio resource.

Because PH varies according to various reasons such as configured maximum UE output power variation, pathloss variation, and TPC error, the eNB's PH variation detection failure causes unfair resource allocation.

Figure 4:
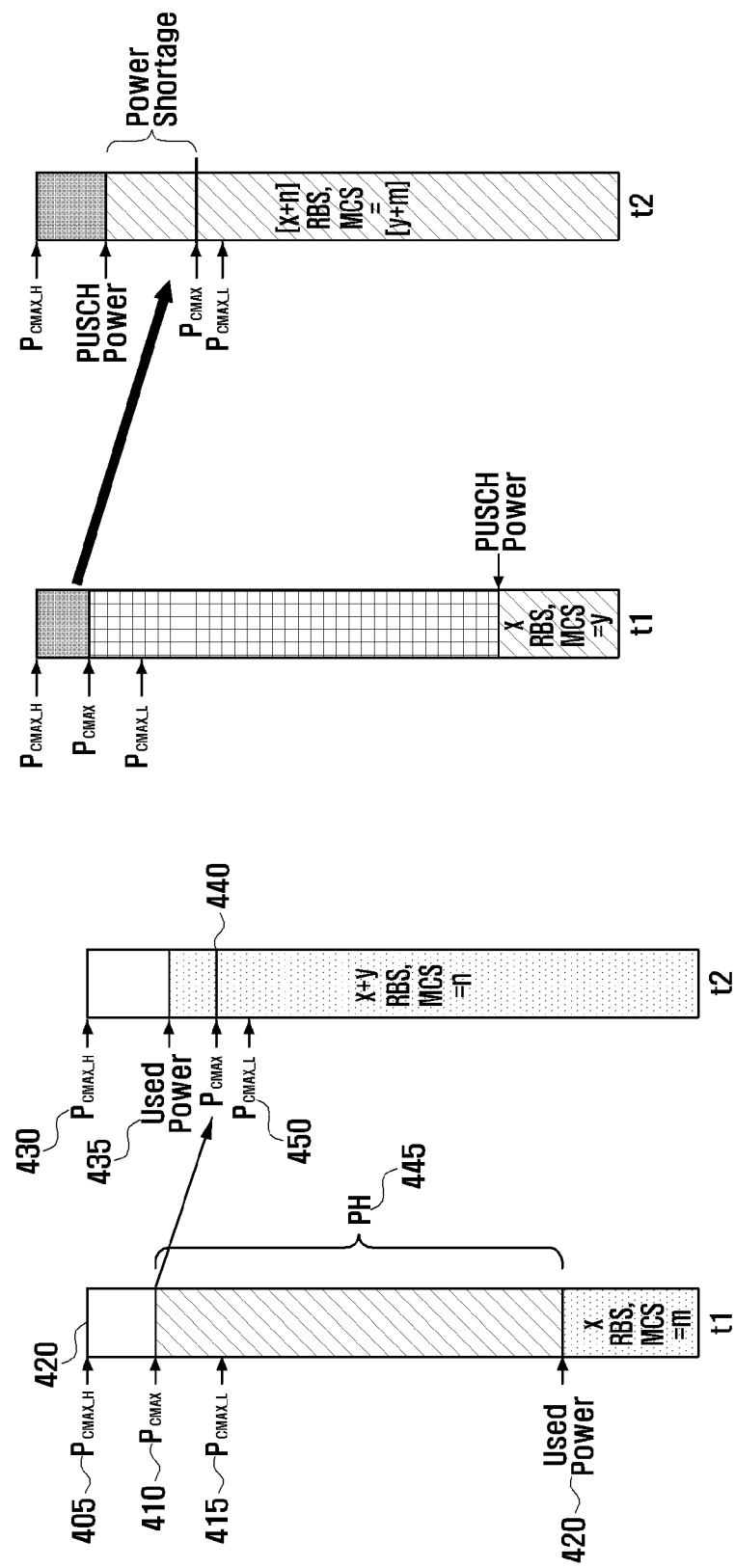
FIG. 4 is a diagram illustrating transmit power configuration caused by unfair scheduling in a method according to the related art.

FIG. 4 is a diagram illustrating transmit power configuration caused by unfair scheduling in a method according to the related art.

Reference number 400 denotes the UE's power usage. The configured maximum UE output power $P_{CMAX}$ 410 is a value set between the upper bound $P_{CMAX\_H}$ 405 and a lower bound $P_{CMAX\_L}$ 415 based on the parameters provided by the eNB and predetermined parameters. The UE transmits data with the Modulation and Coding Scheme (MCS)=m on the allocated radio resource of x resource blocks (RBs) at time t1. At this time, the used power 420 is very low as compared to the configured maximum UE output power. If a specific condition is satisfied, then the UE reports to the eNB the PH 445, (i.e., the difference between the configured maximum UE output power and the used power 420). The eNB determines that the configured maximum UE output power is not short even though much of the radio resource is allocated to the UE, based on the PH. In order to provide the service at higher data rate, the eNB further allocates y RBs to the UE with a higher MCS level of n. However, the configured maximum UE output power $P_{CMAX}$ 440 decreases while the used power 435 increases such that $P_{CMAX}$ 440 becomes less than the used power 435 at time t2. As an example, the used power 435 at time t2 is also greater than the lower bound $P_{CMAX\_L}$ 450. At time t2, the configured maximum UE output power $P_{CMAX}$ 440 is a value set between the upper bound $P_{CMAX\_H}$ 430 and a lower bound $P_{CMAX\_L}$ 450 based on the parameters provided by the eNB and predetermined parameters.

The $P_{CMAX}$ 440 becomes less than the used power 435 at time t2 because the configured maximum UE output power 440 has changed according to the variations of number and locations of scheduled Physical Resource Blocks (PRBs), system bandwidth, frequency band, and number of scheduled carriers. This problem can be solved in such a manner that the UE reports the PH and configured maximum UE output power to the eNB at an appropriate time point such that the eNB performs uplink scheduling on the UE in consideration of the time-varying configured maximum UE output power. One of the factors influencing the $P_{CMAX}$ is Power Management Maximum Power Reduction (P-MPR). Exemplary embodiments of the present invention provide a method and apparatus for reporting to the eNB whether the P-MPR is changed at an appropriate time point.

In order to determine the factors influencing the configured maximum UE output power, it is necessary to check the criteria for determining the configured maximum UE output power. For example, once the $P_{CMAX\_H}$ and $P_{CMAX\_L}$ are determined according to the parameters provided by the eNB and predetermined parameters, the UE may determine $P_{CMAX}$ within the bounds provided in Equations 1, 2, and 3.

$$P_{CMAX\_L} \leq P_{CMAX} \leq P_{CMAX\_H} \quad (1)$$

where $P_{CMAX\_H}$ and $P_{CMAX\_L}$ are defined as follows:

$$P_{CMAX\_L} = \text{MIN}\{P_{EMAX} - T_C, P_{PowerClass} - \text{MAX}(MPR + A\text{-}MPR, P\text{-}MPR) - T_C\} \quad (2)$$

$$P_{CMAX\_H} = \text{MIN}\{P_{EMAX}, P_{PowerClass}\} \quad (3).$$

$P_{EMAX}$ is maximum allowed UE output power in, for example, SystemInformationBlockType1 (SIB1) broadcasted by the eNB. $P_{PowerClass}$ is maximum UE power specified without taking into account the tolerance. $P_{CMAX\_H}$ is defined as the minimum value between $P_{EMAX}$ and $P_{PowerClass}$.

Meanwhile, $P_{CMAX\_L}$ is somewhat complex. $P_{CMAX\_L}$ is influenced by MPR+A-MPR and P-MPR. $\Delta T_C$, MPR, and A-MPR are the parameters for defining the ceiling value to adjust maximum UE transmission power on the serving cell such that the unintended radiation or interference to adjacent channel meet to a predetermined requirement. MPR is the value determined according to the amount of transmission resource allocated to the UE and modulation scheme. A-MPR is the value determined according to uplink frequency band, geographical characteristic, and uplink transmission bandwidth. A-MPR is used for the case of frequency band particularly sensitive to ambient spurious radiation. $\Delta T_{CC}$ is the parameter for allowing additional transmission power adjustment in case where uplink transmission is performed at an edge of the frequency band. For example, if uplink transmission is performs on the lowest 4 MHz or the highest 4 MHz of a certain frequency band, the UE sets $\Delta T_C$ to 1.5 dB and, otherwise, UE sets $\Delta T_C$ to 0.

P-MPR is a maximum power reduction value applied for satisfying Specific Absorption Rate (SAR) requirement and is determined in consideration of the distance between the device and human body. For example, if the distance between the device and human body is short, then the total transmission power value of the UE should decrease and, for this, a high value of P-MPR is applied. In contrast, if the distance between the device and the human body is long, then it is tolerable to increase the total transmit power value of the device such that P-MPR is set to a low value. P-MPR is associated with the power control such that when multiple carriers are used or data transmission is performed along with other system modem the maximum power allocated per carrier or system is restricted. Such influence is reflected to P-MPR.

Accordingly, the configured maximum UE output power PCMAX is mainly influenced by two factors. For example, the configured maximum UE output power PCMAX may be mainly influenced by the MPR+A-MPR related to the out-of-band emission requirement, and by the P-MPR related to the power management. Because the eNB cannot predict the variation of P-MPR, the UE reports, when detecting variation of P-MPR over a predetermined threshold, the PH variation amount (or PH) to the eNB. Also, because only the PH is not enough for determining the power actually used by the UE, the UE reports the configured maximum UE output power too. Also, by indicating which of p-MPR and MPR+A-MPR is mainly used for determining the maximum transmit power, the eNB can observe the variation of the configured maximum UE output power and record the result in a database to remove the influence of the P-MPR.

Figure 5:
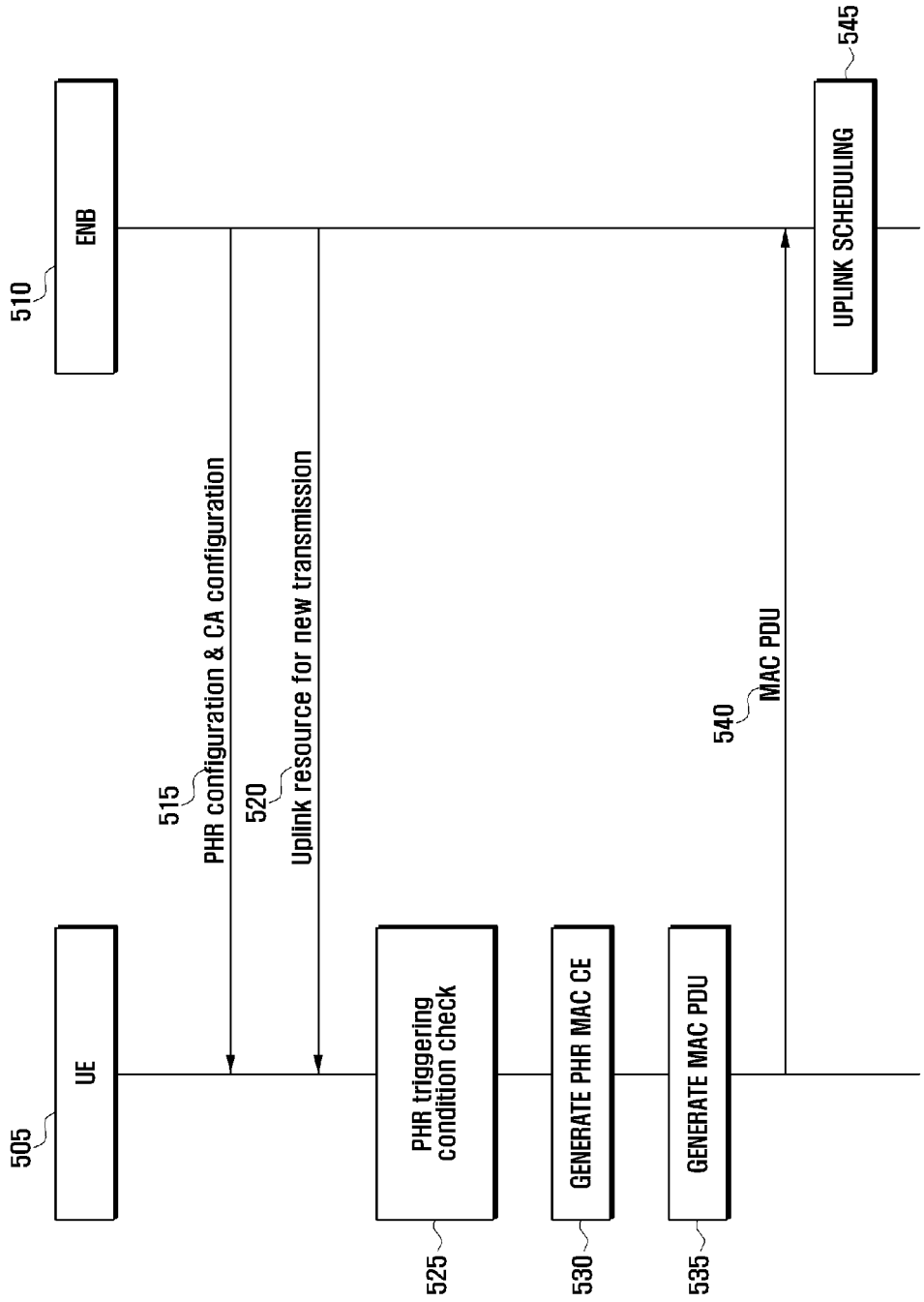
FIG. 5 is a signaling diagram illustrating a Power Headroom Report (PHR) procedure according to an exemplary embodiment of the present invention.

FIG. 5 is a signaling diagram illustrating a Power Headroom Report (PHR) procedure according to an exemplary embodiment of the present invention.

In the mobile communication system including an UE 505 and an eNB 510, the eNB 510 firsts configures the UE in consideration of the UE capability and network status at step 515. At this time the eNB 510 can configure Carrier Aggregation (CA) and PHR of the UE 505. If multiple uplink carriers are configured for the eNB 505 (i.e., if multiple serving cells having uplink resources are configured), then the eNB 510 can configure the UE to use an extended PHR function or an extended PHR MAC CE. In order to configure the extended PHR, the eNB 510 provides the information related to PHR as follows:

(a) phr-Config
 periodicPHR-Timer: A timer value for periodic PHR report. The expiry of this timer triggers PHR.
 prohibitPHR-Timer: A timer value for avoiding PHR reports that are too frequent (i.e., a timer so as to limit the frequency of PHR reports). No new PHR is triggered while this timer is running
 dl-PathlossChange: A new PHR is triggered when the variation of uplink pathloss is equal to or greater than this value. Or, a new PHR is triggered when the variation of P-MPR is equal to or greater than this value.

(b) extendedPHR: This indicates whether an extended PHR is used.

Upon receipt of the control message, the UE 505 configures downlink and uplink and continues normal operations according to the instruction from the eNB 510.

Afterward, the UE 505 is allocated transmission resource for new uplink transmission at step 520 and determines whether PHR condition is satisfied at step 525. The PHR condition is fulfilled in the following cases:

(a) expiry of periodicPHR-Timer
(b) the prohibitPHR-Timer is not running and the amount of downlink pathloss of the serving cell providing pathloss among the serving cells activated and configured with uplinks is equal to or greater than dl-PathlossChange as compared to the previous PHR.
(c) the prohibitPHR-Timer is not running and there is a serving cell fulfilling the following conditions among the serving cells activated and configured with uplinks:
 uplink transmission is performed in the last PHR report and current PHR report
 a difference between the transmit power reduction related to P-MPR in the uplink transmission with the last PHR (or allowed by P-MPR) and the transmit power reduction related to P-MPR in the current uplink transmission is equal to or greater than dl-PathlossChange.

A description is made of the third condition (c) in more detail hereinafter with reference to FIG. 6.

Figure 6:
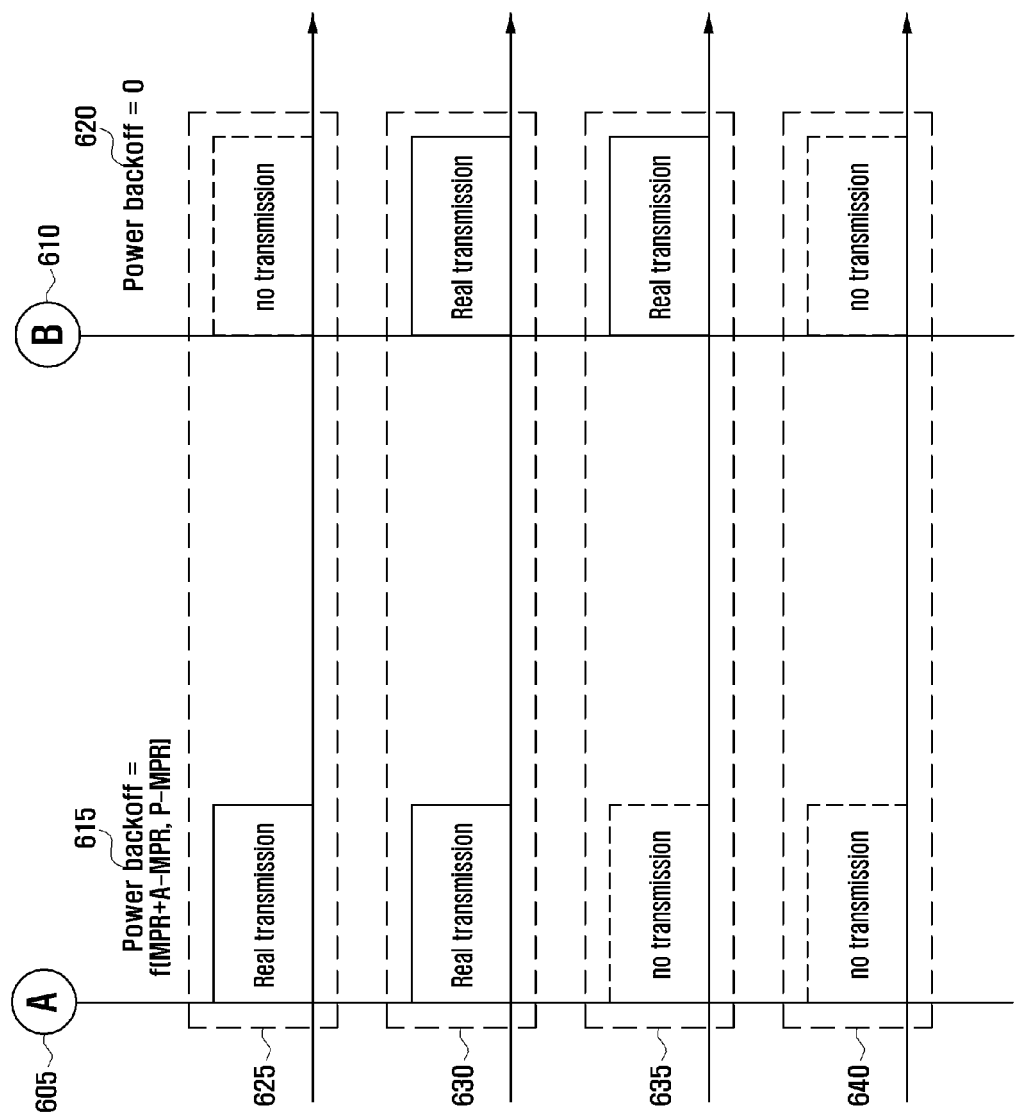
FIG. 6 is a diagram is a diagram illustrating a Power Headroom Report (PHR) triggered by variation of a Power Management Maximum Power Reduction (P-MPR) in a Power Headroom Report method according to an exemplary embodiment of the present invention.

FIG. 6 is a diagram is a diagram illustrating a Power Headroom Report (PHR) triggered by variation of a Power Management Maximum Power Reduction (P-MPR) in the Power Headroom Report method according to an exemplary embodiment of the present invention.

In order to determine uplink transmit power for a certain serving cell while observing various restrictions, the UE performs power reduction or power backoff, and the power reduction amount is determined according to the parameters such as MPR, A-MPR, and P-MPR. The parameters related to the power reduction in a certain service cell change according to whether uplink transmission takes place actually on the serving cell.

For example, when no actual uplink transmission takes place, power backoff is not applied as denoted by reference number 620. Accordingly, the various transmit power parameters including P-MPR are set to 0. In contrast, when actual uplink transmission takes place, the power backoff value is determined in consideration of P-MPR satisfying the SAR requirement. In PHR, the UE reports PH and $P_{CMAX}$ in all of the activated serving cells with configured uplinks at the corresponding time point. Accordingly, even though no actual uplink transmission takes place in a serving cell at the time when generating PHR, P-MPR is determined. Of course, the P-MPR is not an actual P-MPR but a predetermined value (i.e., 0).

By taking an example of PHR at certain time points A 605 and B 610, suppose a situation in which an actual transmission takes place at a time point A as denoted by reference number 625 and no actual transmission at a time point B in a certain serving cell. In this case, the real P-MPR is applied at the time point A while the P-MPR set to 0 is applied at the time point B such that, although the transmit power reduction related to the real P-MPR is tiny (i.e., although the transmission power reduction value related to P-MPR is not changed nearly if actual uplink transmission takes place at the time point B in the corresponding serving cell), the UE can determine that arithmetic variations of P-MPR is equal to or greater than a predetermined threshold. As a consequence, PHR is transmitted unnecessarily.

Such a problem occurs in all the cases in which P-MPR is set to 0 due to no actual transmission takes place at least one of time points A and B (such as those instances denoted by reference numbers 625, 635, and 640). In exemplary embodiments of the present invention, PHR is triggered in consideration of the variation amount of the transmit power reduction related to P-MPR. However, PHR is triggered in consideration of the variation amount of the transmit power reduction related to P-MPR only when the actual transmission takes place at both the two time points (i.e., A and B as denoted by reference number 630).

If the PHR condition is fulfilled, the UE 505 generates a PHR MAC CE at step 530. Because the UE is instructed to use extended PHR MAC CE in PHR configuration process, the UE calculates PH per serving cell using Equation 4 in consideration of the $P_{CMAX,c}$ and required transmit power of the activated serving cells and configured to have uplink.

$$PH(i)=P_{CMAX,c}(i)-\{10\log_{10}(M_{PUSCH,c}(i))+P_{O\_PUSCH,c}(j)+\alpha_c(j)\cdot PL_c+\Delta_{TF,c}(i)+f_c(i)\} \quad (4)$$

PH(i) of $i^{th}$ subframe in serving cell c is calculated based on the power offset $\Delta_{TF,c}$ derived from MCS, pathloss $PL_c$, and accumulated Transmit Power Controls (TPCs) $f_c(i)$. In Equation 4, $PL_c$ denotes the path loss of the cell configured to provide the pathloss for the serving cell c. The pathloss used for determining uplink transmit power of a certain serving cell is the pathloss of the uplink channel of the corresponding cell or the path loss of the downlink channel of another cell. The eNB selects the pathloss to be used and notifies the UE of the selected pathloss in the call setup process.

In Equation 4, $f_c(i)$ is the accumulated value of the Transmit Power Control (TPC) on the serving cell c. PO_PUSCH,C denotes a parameter of higher layer as sum of cell-specific and UE-specific values. Typically, PO_PUSCH,C has a value determined according to the type of Physical Uplink Shared Channel (PUSCH) such as semi-persistent scheduling, dynamic scheduling, and random access response. $\alpha_c$ is a 3-bit cell-specific value representing a weight applied to the pathloss for calculating uplink transmit power (i.e., the higher this value is the more the pathloss influence increases) and its value is restricted according to the type of the PUSCH transmission. For example, this value is set to j=0 for semi-persistent scheduling, j=1 for dynamic scheduling, and j=2 for random access response.

For the serving cell having no actual transmission, PH is calculated with $P_{CMAX,c}$ determined with zero transmit power reduction and the required transmit power using predetermined values of $M_{PUSCH,c}(i)$ and $\Delta_{TF,c}$ (e.g., a value indicating the lowest MCS level and 1 transport block).

The UE inserts the PH and other information per serving cell in the extended PHR MAC CE.

Figure 7:
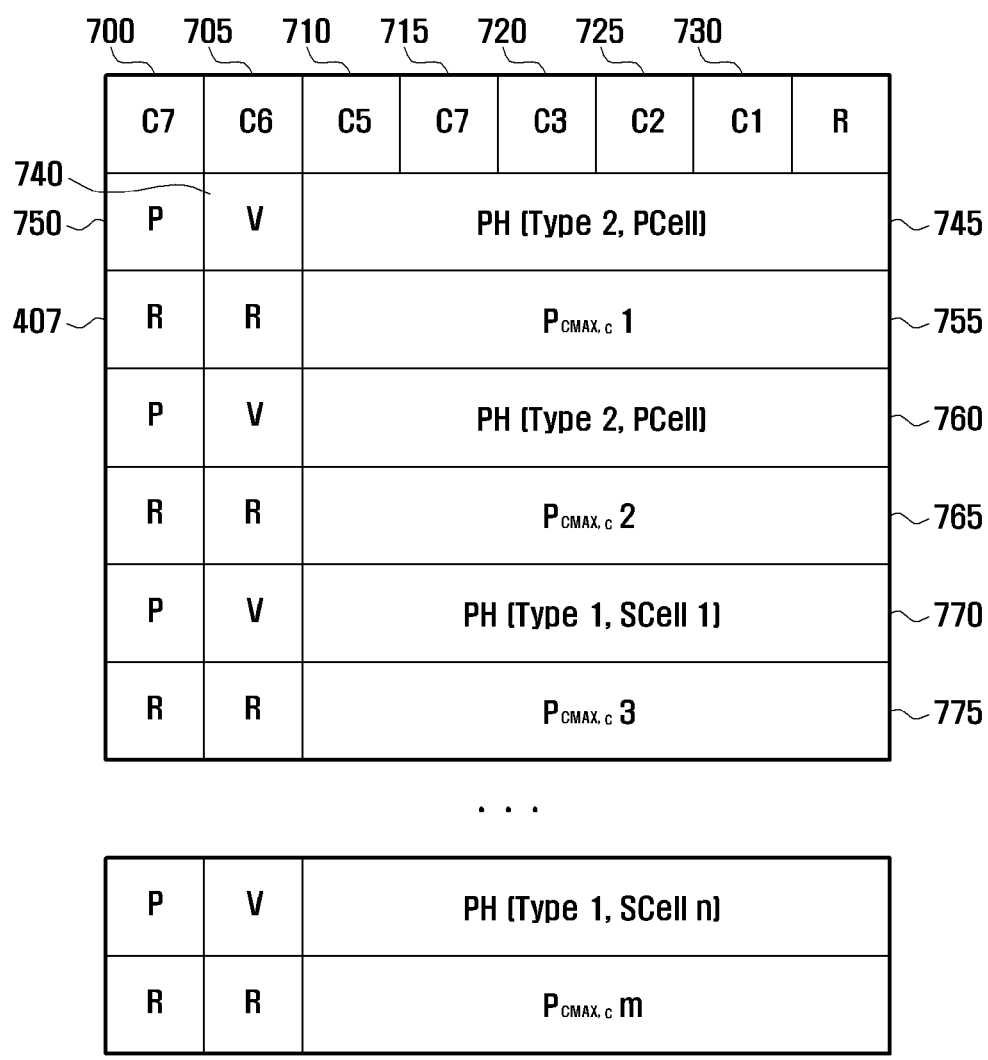
FIG. 7 is a diagram illustrating a structure of an extended Power Headroom Report (PHR) Medium Access Control (MAC) Control Element (CE) for use in a Power Headroom Report (PHR) method according to an exemplary embodiment of the present invention.

FIG. 7 is a diagram illustrating a structure of an extended Power Headroom Report (PHR) Medium Access Control (MAC) Control Element (CE) for use in a Power Headroom Report (PHR) method according to an exemplary embodiment of the present invention.

In case of reporting PHs for multiple serving cells in a mobile communication system supporting Carrier Aggregation, it is advantageous to transmit the multiple PHs in a single PHR in view of traffic overhead. Unlike the normal MAC CE, the extended PHR MAC CE is designed to report PHs and $P_{CMAX,c}$ for multiple cells. In FIG. 7, reference numbers 700 to 730 (i.e., 700, 705, 710, 715, 720, 725, and 730) denote a bitmap indicating PHs for the serving cells that are included in the corresponding PHR. Each bit of the bitmap corresponds to SCell index indicating a SCell. Reference number 750 denotes a P bit indicating whether the configured maximum UE output power $P_{CMAX}$ is influenced by the P-MPR according to an exemplary embodiment of the present invention.

Although there is no actual PUSCH transmission, the eNB can trigger PHR to acquire pathloss on a specific uplink carrier. Such a PHR trigger can be implemented by defining a transmission format (transmission resource amount and MCS level) for use in PH calculation. In order to interpret the reported PHs correctly, the eNB has to know whether the per-cell PH included in the PHR is calculated in consideration of real PUSCH transmission or using a predetermined transmission format. Reference number 740 denotes a V bit which is 1-bit indicator for indicating whether the PH is calculated in consideration of real PUSCH transmission. In PHR, the UE sets the V bit to a predetermined value (e.g., 0) if the UE calculates the PH for the corresponding cell based on the real PUSCH transmission (i.e. using real transmission format) or another value (e.g. 1) if the UE calculates the PH for the corresponding cell using the reference format (i.e., number of RBs=1 and $\Delta_{TF}$=0) because of no real PUSCH transmission in the corresponding cell.

Reference numbers 745 and 755 are PH and $P_{CMAX}$ respectively. The PHs for the individual carriers are arranged in unit of byte in ascending order of index (i.e., type 2 PH and $P_{CMAX}$ for PCell, type 1 PH 760 and $P_{CMAX}$ 765 for PCell, PH 770 and $P_{CMAX}$ 775 for SCell having the lowest index, PH and $P_{CMAX}$ for SCell having the second lowest index, PH and $P_{CMAX}$ for SCell having the third lowest index, and PH and $P_{CMAX}$ for SCell having the fourth lowest index). The type 2 PH is reported only for the PCell and calculated in consideration of PUCCH requirement transmit power as well as PUSCH requirement transmit power. Reference number 407 denotes an R bit indicating reserved bit.

At step 535, the UE generates a MAC PDU, multiplexes the PHR MAC CE in the MAC PDU. The UE transmits the MAC PDU to the eNB at step 540. The UE records the information on the pathloss, $P_{CMAX}$, P-MPR, and whether the PH is calculated in consideration of real data transmission that are applied in PH calculation per serving cell.

At step 545, if the PHR MAC CE is received, the eNB checks the per-serving cell PHs, whether P-MPR is applied or not, and whether PH variation is caused by P-MPR variation, and allocates uplink transmission resource in consideration of the check result.

Figure 8:
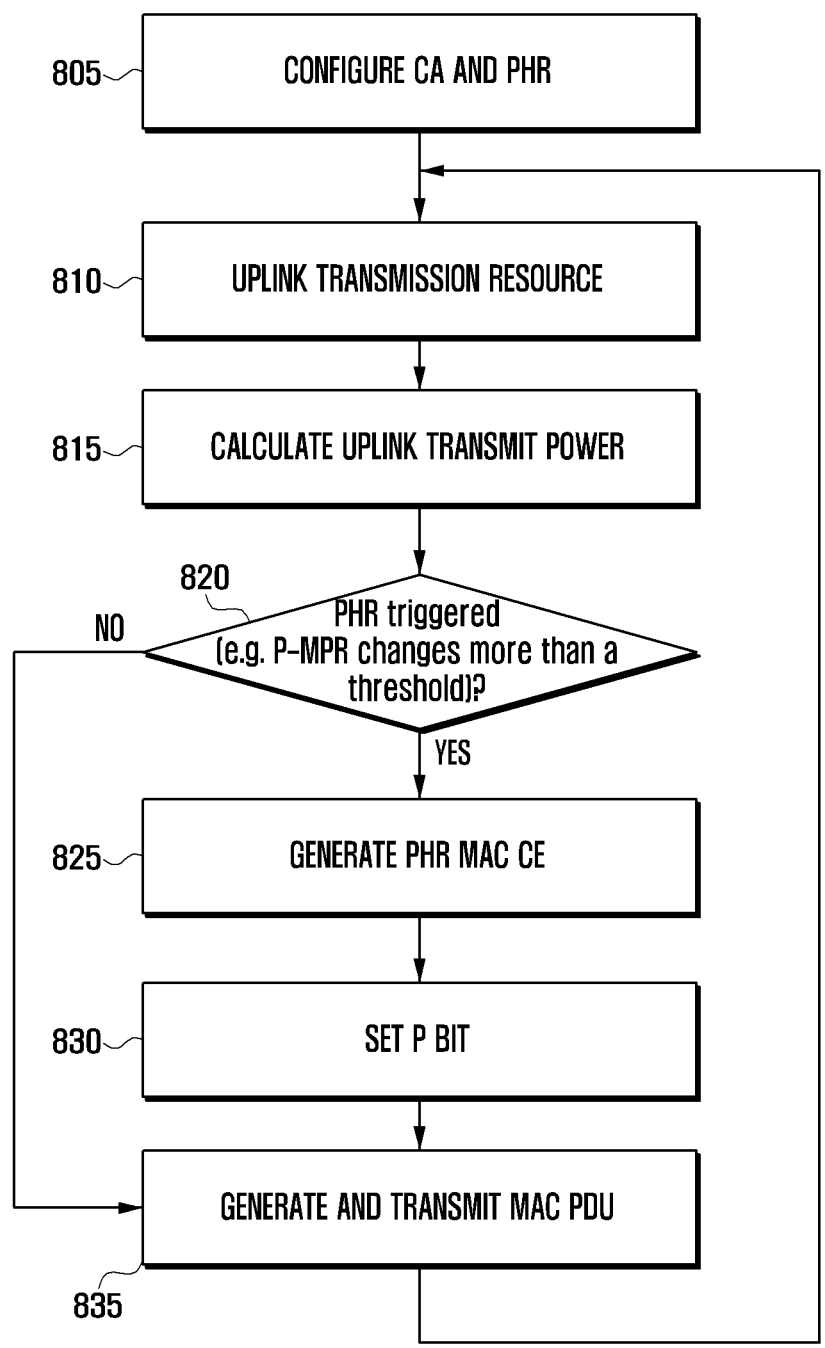
FIG. 8 is a flowchart illustrating a Power Headroom Report (PHR) method according to an exemplary embodiment of the present invention.

FIG. 8 is a flowchart illustrating a Power Headroom Report (PHR) method according to an exemplary embodiment of the present invention.

The UE receives a control message and configures Carrier Aggregation and extended PHR according to the information carried in the control message at step 805. The control message includes the control information such as phr-config and extendedPHR. Afterward, the UE performs normal follow-up operation.

The UE is allocated uplink transmission resource for new uplink transmission at step 810 and calculates uplink transmit power at step 815. The uplink transmission power is calculated per serving cell. The UE determines $P_{CMAX,c}$ per serving cell using Equations 1, 2, and 3 and determines the required transmit power by referencing a number of transmission resource blocks, transmission format, and pathloss. Next, the UE selects minimum value between the two values as the transmit power for the corresponding serving cell.

Afterward, the UE determines whether PHR is triggered at step 820. The PHR is triggered when the periodicPHR-Timer expires or the change of uplink pathloss in the service cell in active state and proving pathloss is greater than a dl-PathlossChange as compared to the previous PHR report. If P-MPR greater than 0 is currently applied or applied in the last PHR transmission, and if one of the following PHR trigger conditions are fulfilled, then PHR is triggered. If the P-MPR greater than 0 is applied, then it is necessary to adjust the LTE transmit power due to the uplink transmission by other radio transmission modem.

The PHR trigger conditions include:
prohibitPHR-Timer expires or has expired, when there is the activated serving cell satisfying the following conditions:
there are UL resources allocated for transmission or there is a PUSCH transmission on a certain serving cell, and the required power backoff on this serving cell has changed more than dl-PathlossChange since the last transmission of a PHR when the UE has UL resources allocated for transmission or PUCCH transmission on this cell at the last PHR transmission timing, the required transmit power backoff for the serving cell is the required transmit power backoff controlled (or allowed) by P-MPR.

The required power backoff controlled (or allowed) by P-MPR means the power backoff to be applied by the UE when only the SAR requirement is considered. The required power backoff controlled by P-MPR may differ from the real power backoff applied. For example, if the power backoff to be applied for fulfilling the neighbor channel interference restriction requirement such as MPR and A-MPR at a certain time point is A dB and the power backoff to be applied for fulfilling SAR requirement is B dB, then the required power backoff controlled by P-MPR is B dB. The real power backoff applied by the UE is determined by the maximum value between A and B.

Next, the UE calculates PH per serving cell using Equation 4 in consideration of the $P_{CMAX,c}$ and required transmit power on the activated serving cells with configured uplink at step 825. The UE generates the extended PHR MAC CE with per-serving cell PHs and other information as shown in FIG. 7.

Next, the UE sets P bit to a corresponding value at step 830. The P bit is a 1-bit indicator for indicating whether which of P-MPR and MPR+A-MPR has contributed to the calculation of $P_{CMAX,c}$ per serving cell. The P-bit set to 0 if the maximum transmit power is not influenced by P-MPR for power management, and the P-bit is set to 1 if the maximum transmit power is influenced by P-MPR. That is, the P bit is set to 1 if $P_{CMAX,c}$ has a different value due to the influence of P-MPR, and the P-bit is set to 0 if $P_{CMAX,c}$ has the same value regardless of whether P-MPR is applied or not.

Finally, the UE generates and transmits a MAC PDU at step 835. Afterward, the UE waits for allocation of new uplink transmission resource. The MAC PDU can include the PHR MAC CE.

According to exemplary embodiments of the present invention, PHR MAC CE can be categorized into one of two categories: normal PHR MAC CE and extended PHR MAC CE. The normal PHR MAC CE is the PHR MAC CE used before the introduction of Carrier Aggregation, and the extended PHR MAC CE is the PHR MAC CE introduced for transmitting PHs and supplementary information on multiple serving cells. Typically, the normal PHR MAC CE is composed of 2 reserved bits and 6-bit PH field. The extended MAC CE format is depicted in FIG. 7.

As an example, the network can instruct the UE to use the normal PHR MAC CE or extended PHR MAC CE in consideration of the UE capability and current configuration or network state. This can be done by sending the UE the control information of MAC-MainConfig including the information indicating the use of extended PHR MAC CE (hereinafter, referred to as extendedPHR). This information can indicate one of the four cases determined according to the PHR MAC CE format and whether to use Carrier Aggregation as follows:

(1) Single serving cell with uplink configuration and normal PHR MAC CE;

(2) Multiple serving cells with uplink configuration and normal PHR MAC CE;

(3) Single serving cell with uplink configuration and extended PHR MAC CE; and (4) Multiple serving cells with uplink configuration and extended PHR MAC CE.

The case (2) has no special usefulness but requires determining which type of PH should be inserted for which serving cell in the normal PHR MAC CE, resulting in increase of UE implementation complexity. In exemplary embodiments of the present invention, the case (2) is excluded to reduce UE implementation complexity.

In case in which the UE configured to use the extended PHR MAC CE does not support simultaneous transmission of PUCCH and PUSCH, the type 2 PH field of the PHR MAC CE should be filled with, for example, meaningless information. In order to reduce such overhead, the UE is configured to use the extended PHR MAC CE format having the type 2 PH field when the UE is configured to support simultaneous transmission of PUCCH and PUSCH, and the UE is configured to use the extended PHR MAC CE format having no type 2 PH field when the UE is configured not to support simultaneous transmission of PUCCH and PUSCH.

As aforementioned, the network instructs the UE to use one of the normal and extended PHR MAC CE according to the UE capability and according to the current configuration or network state. This means that the currently used PHR MAC CE format can be changed. If the normal PHR MAC CE format is changed to the extended PHR MAC CE format, it is necessary to transmit the PHR MAC CE of the new format quickly. According to exemplary embodiments of the present invention, this can be accomplished by triggering PHR in a new format.

Figure 9:
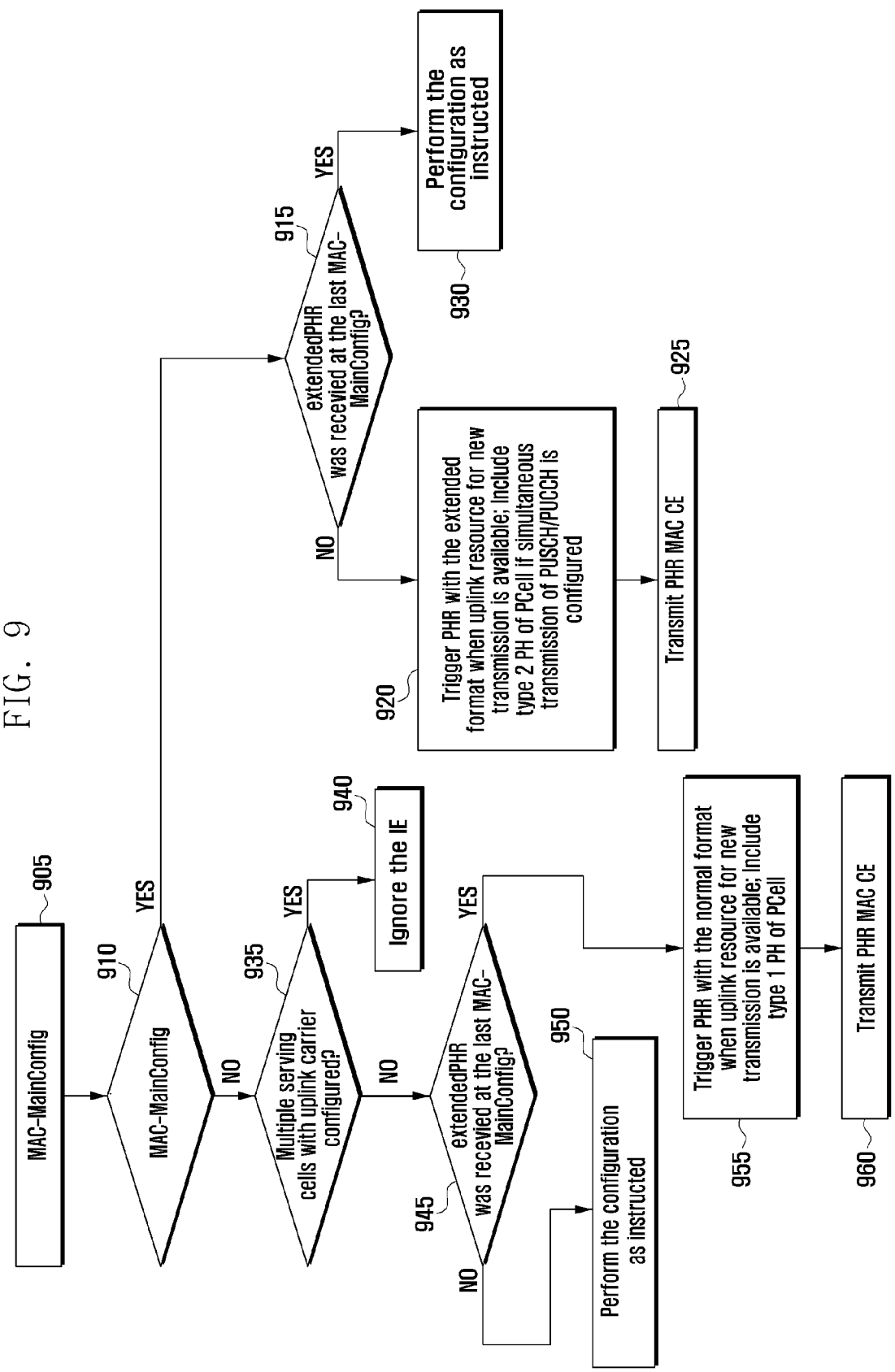
FIG. 9 is a flowchart illustrating a Power Headroom Report (PHR) method according to an exemplary embodiment of the present invention.

FIG. 9 is a flowchart illustrating a Power Headroom Report method according to an exemplary embodiment of the present invention.

The UE first receives the control information referred as MAC-MainConfig from the eNB at step 905. This control information is transmitted to the UE in RRC CONNECTION SETUP message or RRC CONNECTION RECONFIGURATION message. This control information includes configuration information related to the MAC layer functionality such as phr-Config as information related to PHR configuration and extendedPHR.

Next, the UE determines whether the MAC-MainConfig includes extendedPHR (or whether the control message received at step 905 includes extendedPHR information) at step 910 and, if so, the procedure proceeds to step 915 and, otherwise the procedure proceeds to step 935. If this information includes the indicator indicating the use of PHR MAC CE format, such information means to instruct the UE to use the extended PHR MAC CE and, otherwise, the UE is instructed to use the normal PHR MAC CE.

At step 915, the UE determines whether the most recently received MAC-MainConfig (or a most recently received control message, e.g., RRC CONNECTION SETUP message or RRC CONNECTION RECONFIGURATION message) includes extendedPHR. If it is determined that the extendedPHR is included at step 915, then the procedure proceeds to step 930 and, otherwise, the procedure proceeds to step 920. If the most recently received MAC-MainConfig information includes no extendedPHR, then this means that the normal PHR MAC CE is recommended.

If the procedure proceeds to step 920, this means that the PHR MAC CE format is changed for the normal PHR MAC CE format. The UE triggers PHR and generates PHR MAC CE in extended format when the uplink transmission resource for new transmission is available at step 920. At this time, the UE determines whether to include type 2 PH according to whether simultaneous PUSCH and PUCCH transmission is configured. If the simultaneous PUSCH and PUCCH transmission is configured, the UE includes the type 2 PH in the extended PHR MAC CE and, otherwise, the UE excludes the type 2 PH. Next, the UE transmits the extended PHR MAC CE at step 925 and terminates the procedure. As an example, the PHR MAC CE generation procedure corresponds to step 825 of FIG. 8.

If it is determined that no extendedPHR is included at step 910, then the UE determines whether there are multiple serving cells with uplink carrier configuration at step 935. If there are multiple serving cells with uplink carrier configuration, then the procedure proceeds to step 940. If there are not multiple serving cells with uplink carrier configuration, then the procedure proceeds to step 945. The multiple serving cells can be configured with uplink carriers according to the information of the RRC Control message including MAC-MainConfig or has been configured with uplink carriers already before receiving the RRC control message.

If the procedure proceeds to step 940, this means that the UE has received the command for use of normal PHR MAC CE although multiple cells are configured with uplink carriers. Accordingly, the UE determines occurrence of unexpected error and ignores the information to maintain the normal PHR MAC CE formation at step 940. However, the UE processes other control information included in the RRC control message normally with the exception of the erroneous information.

In order to determine whether the PHR MAC CE format is changed, the UE determines whether the most lately received MAC-MainConfig includes extendedPHR at step 945 and, if so, the procedure proceeds to step 955 and, otherwise, the procedure proceeds to step 950.

If the procedure proceeds to step 955, this means that the PHR MAC CE format is changed from extended PHR MAC CE formation to normal PHR MAC CE format. Accordingly, the UE triggers PHR with the normal PHR MAC CE format when the uplink resource for new transmission is available. If the simultaneous PUSCH and PUCCH transmission is configured, the UE selects and includes the type 1 PH in the PH field. Otherwise, if the simultaneous PUSCH and PUCCH transmission is not configured, this means that type 2 PH is out of consideration and thus there is no need for selection. The UE calculates the type 1 PH for the primary serving cell and includes the type 1 PH in the PH field of the normal PHR MAC CE format. Finally, the UE transmits the PHR MAC CE to the eNB at step 960 and terminates the procedure.

For reference, the type 1 PH is determined in consideration of the PUSCH transmit power, and type 2 PH is determined in consideration of both the PUSCH and PUCCH transmission powers.

According to exemplary embodiments of the present invention, the P bit is the first bit of PH byte (e.g., a byte having PH field). An exemplary embodiment of the present invention includes a method for setting the first bit according to the PHR MAC CE format which is currently used by the UE. If the currently used PHR MAC CE format is the normal PHR MAC CE format, the UE sets the first bit to 0 even though the condition for setting the P bit to 1 is satisfied. This is because if the eNB receiving the PHR in normal format is a legacy eNB, then it is expected that the first bit of the PH byte is set to 0 such that, if this bit is set to 1, then the eNB is likely to malfunction. Otherwise, if the PHR MAC CE format is the extended PHR MAC CE format, this means that the eNB is of interpreting the P bit correctly such that UE sets the P bit normally.

Figure 10:
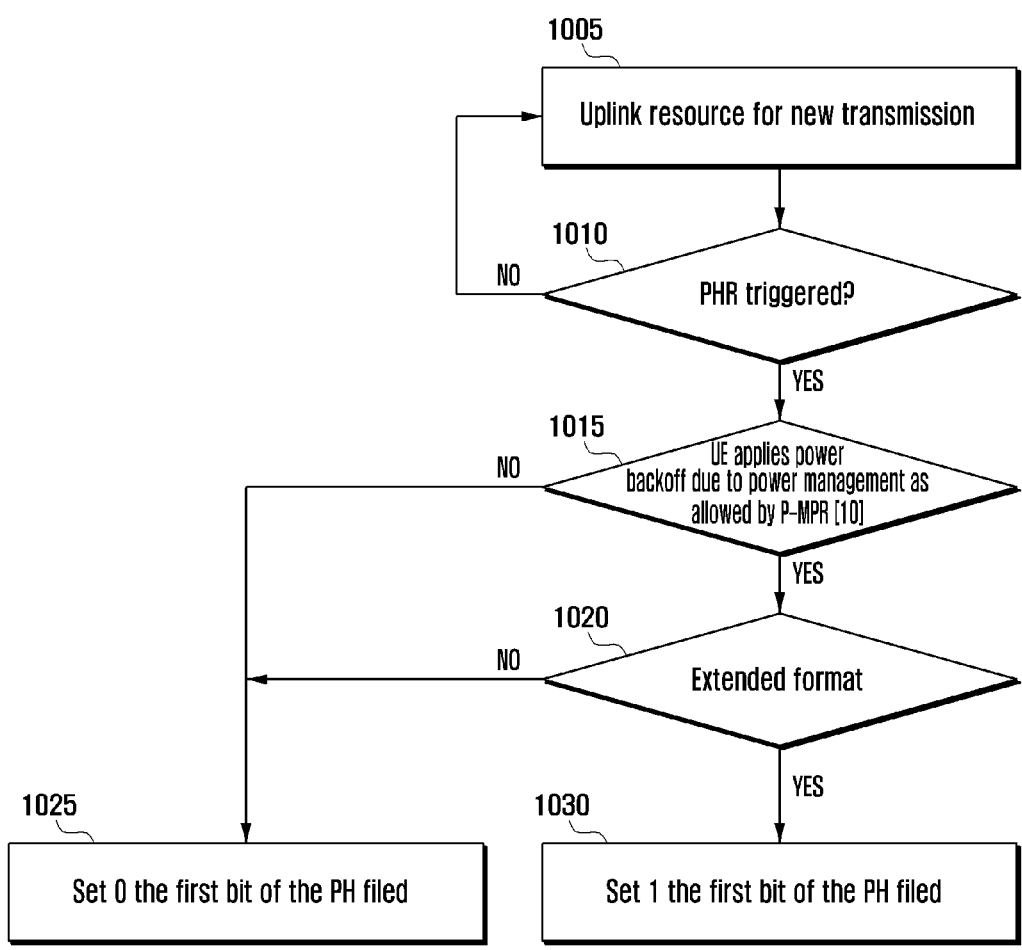
FIG. 10 is a flowchart illustrating a Power Headroom Report (PHR) method according to an exemplary embodiment of the present invention.

FIG. 10 is a flowchart illustrating a Power Headroom Report (PHR) method according to an exemplary embodiment of the present invention.

The UE is allocated uplink resource for new transmission at step 1005 and determines whether PHR is triggered at step 1010. For example, the UE operation at step 1010 is identical with the operation at step 820 of FIG. 8.

If it is determined that no PHR is triggered at step 1010, then the UE waits for allocation of uplink resource for new transmission while performing normal operation. If PHR is triggered at step 1010, then the procedure proceeds to step 1015. At step 1015, the UE determines whether power backoff due to power management as allowed by P-MPR is applied for calculating PH or $P_{CMAX,c}$. In more detail, the UE determines whether the maximum transmit power is influenced by the P-MPR for power management. For example, the UE determines whether the $P_{CMAX,c}$ is changed to a different value by the P-MPR for power management. If it is determined that the power backoff due to power management as allowed by P-MPR is not applied for calculating PH or $P_{CMAX,c}$, then the procedure proceeds to step 1025. Otherwise, the procedure proceeds to step 1020.

At step 1020, the UE determines whether the current PHR MAC CE format is the extended PHR MAC CE format. In other words, the UE determines whether the most lately received MAC-MainConfig includes extendedPHR and, if so, the procedure proceeds to step 1030 and, otherwise, step 1025. At step 1030, the UE set the first bit of the PH byte to 1 (i.e. sets the P bit to 1) and transmits the PHR MAC CE. At step 1025, the UE sets the first bit of the PH byte to 0 (i.e., sets the P bit to 0) and transmits the PHR MAC CE.

Figure 11:
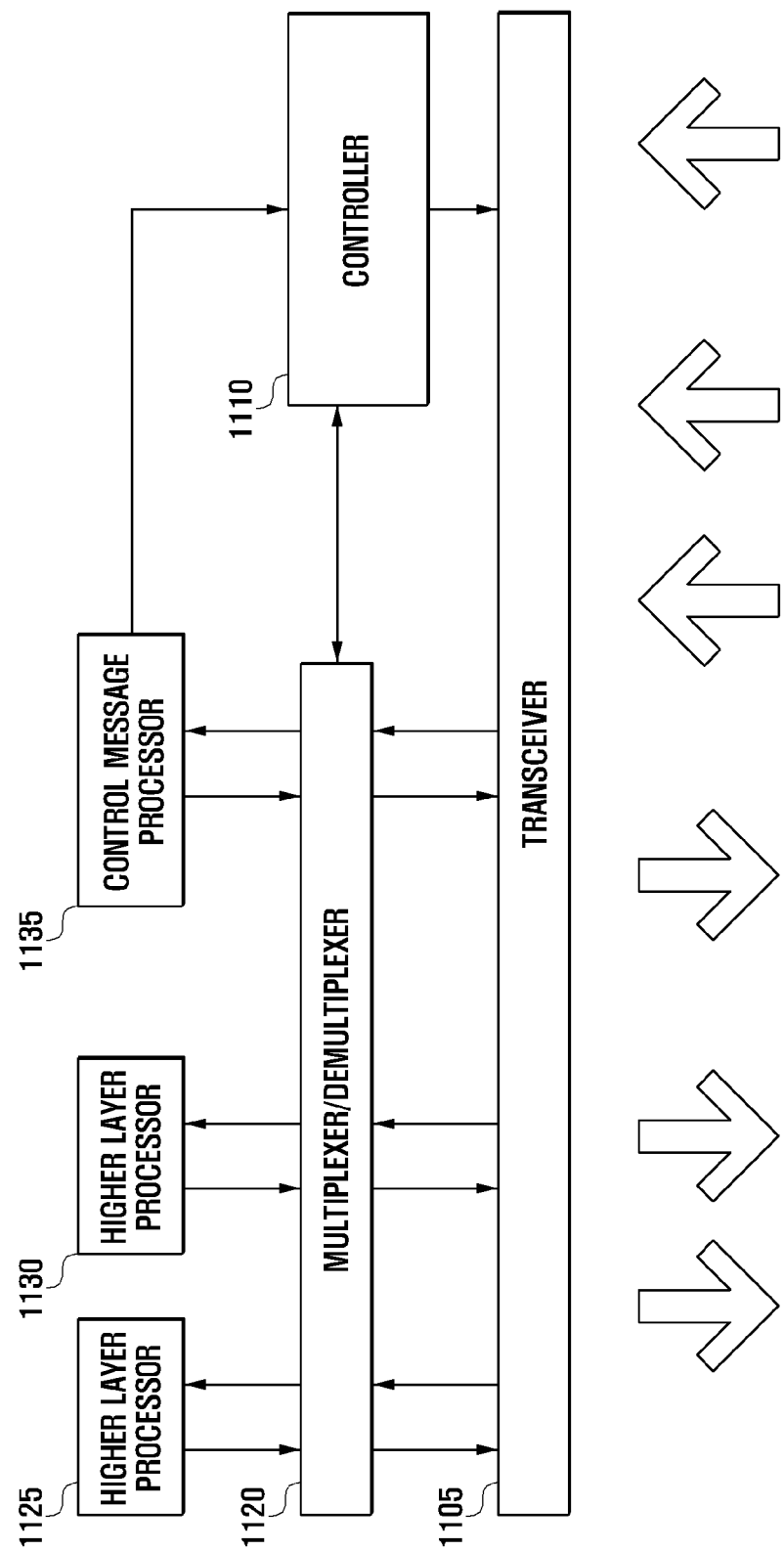
FIG. 11 is a block diagram illustrating a configuration of an User Equipment (UE) according to an exemplary embodiment of the present invention.

FIG. 11 is a block diagram illustrating a configuration of an User Equipment (UE) according to an exemplary embodiment of the present invention.

Referring to FIG. 11, the UE according to exemplary embodiments of the present invention includes a transceiver 1105, a controller 1110, a multiplexer/demultiplexer 1120, a control message processor 1135, and higher layer processors 1125 and 1130.

The transceiver 1105 receives data and control signal on the downlink channel, and transmits data and control signal on the uplink channel in a serving cell. If multiple serving cells are configured, the transceiver 1105 transmits and receives data and control signals in the multiple serving cells.

The multiplexer/demultiplexer 1102 multiplexes the data generated by the higher layer processors 1125 and the control message processor 1135, and demultiplexes the data received by the transceiver and delivers the demultiplexed data to the higher layer processor 1125 and 1130 and/or the control message processor 1135.

The control message processor 1135 processes the control message received from the eNB and takes an appropriate action. That is, the control message processor 1135 is responsible for configuring PHR function by referencing the control information such as MAC-MainConfig included in the RRC control message.

Each of the higher layer processors 1125 and 1130 is configured per service and processes the data generated in association with the user service such as File Transfer Protocol (FTP) and Voice over Internet Protocol (VoIP) to the multiplexer/demultiplexer 1120 or processes the data from the multiplexer/demultiplexer 1120 to the higher layer service application.

The controller 1110 checks the scheduling command (e.g. uplink grants) received through the transceiver 1105, and controls the transceiver 1105 and multiplexer/demultiplexer 1120 to perform uplink transmission with appropriate transmission resource at appropriate timing. The controller 1110 calculates uplink transmit power per cell, determines whether to trigger PHR, and set P bit.

Although the description is directed to the case where the controller 1110, the multiplexer/demultiplexer 1120, the control message processor 1135, and higher layer processors 1125 and 1130 are implemented as separate function blocks responsible for different functions for convenience of technical explanation, the UE is not limited to this configuration. For example, the functions of the multiplexer/demultiplexer 1120, the control message processor 1135, and the higher layer processors 1125 and 1130 can be performed by the controller 1110.

As described above, the Power Headroom Report method and apparatus of the exemplary embodiments of the present invention is advantageous to report the UE's Power Headroom per cell efficiently in the system operating in Carrier Aggregation mode.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for reporting power headroom (PH) by a terminal in a wireless communication system, the method comprising:
   determining whether power backoff due to power management is changed more than a threshold value;
   identifying whether an extended power headroom report (PHR) is configured;
   and
   transmitting, to a base station, the extended PHR if the power backoff due to the power management is changed more than the threshold value and the extended PHR is configured,
   wherein the extended PHR includes a field for indicating whether or not the power backoff due to the power management is applied, the field corresponding to a first bit of an octet including a PH in the extended PHR.

2. The method of claim 1, wherein the threshold value corresponds to a downlink pathloss change (DL-Pathloss Change).

3. The method of claim 1, wherein the field is 1 bit which is set to 1 for triggering of the PHR based on the change of the power backoff due to the power management, and set to 0 for triggering of the PHR based on a reason other than the change of the power backoff due to the power management.

4. The method of claim 1,
   wherein the field is 1 bit if the PHR is the extended format,
   wherein the field is set to 1 if the power backoff due to the power management is applied, and
   wherein the field is set to 0 if the power backoff due to the power management is not applied.

5. The method of claim 1, further comprising calculating uplink transmit power before determining whether to transmit the PHR.

6. The method of claim 5, wherein the calculating of uplink transmit power comprises determining a minimum value between a maximum transmit power and a required transmit power as the uplink transmit power, the required transmit power being calculated based on at least one of a number of transmission resource blocks, a transmission format, and a pathloss.

7. The method of claim 6, wherein the maximum transmit power is a value selected between an upper bound ($P_{CMAX\_H}$) and a lower bound ($P_{CMAX\_L}$) that are determined by following equations:

$$P_{CMAX\_L} = \text{MIN}\{P_{EMAX} - T_C, P_{PowerClass} - \text{MAX}(MPR + A\text{-}MPR, P\text{-}MPR) - T_C\},$$

$$P_{CMAX\_H} = \text{MIN}\{P_{EMAX}, P_{PowerClass}\}$$

where $P_{EMAX}$ is a maximum allowed terminal output power provided by the base station, $P_{PowerClass}$ is a maximum available terminal power, $\Delta T_C$ is a parameter for allowing additional transmission power relaxation when uplink transmission is performed at an edge of a frequency band.

8. A terminal for reporting power headroom (PH) in a wireless communication system, the terminal comprising:
   a transceiver configured to transmit and receive a signal; and
   a controller configured to:
      determine whether power backoff due to power management is changed more than a threshold value,
      identify whether an extended power headroom report (PHR) is configured,
      and
      transmit, to a base station, the extended PHR if the power backoff due to the power management is changed more than the threshold value and the extended PHR is configured,
   wherein the extended PHR includes a field for indicating whether or not the power backoff due to the power management is applied, the field corresponding to a first bit of an octet including a PH in the extended PHR.

9. The terminal of claim 8, wherein the threshold value corresponds to a downlink pathloss change (DL-Pathloss Change).

10. The apparatus of claim 8, wherein the field is 1 bit which is set to 1 for triggering of the PHR based on the change of the power backoff due to the power management, and set to 0 for triggering of the PHR based on a reason other than the change of the power backoff due to the power management.

11. The terminal of claim 8, wherein the field is 1 bit if the PHR is the extended format,
   wherein the field is set to 1 if the power backoff due to the power management is applied, and
   wherein the field is set to 0 if the power backoff due to the power management is not applied.

12. The terminal of claim 8, wherein the controller is further configured to calculate uplink transmit power before determining whether to transmit the PHR.

13. The terminal of claim 12, wherein the controller is further configured to determine a minimum value between a maximum transmit power and a required transmit power as the uplink transmit power, the required transmit power being calculated based on at least one of a number of transmission resource blocks, a transmission format, and a pathloss.

14. The terminal of claim 13, wherein the maximum transmit power is a value selected between an upper bound ($P_{CMAX\_H}$) and a lower bound ($P_{CMAX\_L}$) that are determined by following equations:

$$P_{CMAX\_L} = \text{MIN}\{P_{EMAX} - T_C, P_{PowerClass} - \text{MAX}(MPR + A\text{-}MPR, P\text{-}MPR) - T_C\},$$

$$P_{CMAX\_H} = \text{MIN}\{P_{EMAX}, P_{PowerClass}\}$$

where $P_{EMAX}$ is a maximum allowed terminal output power provided by the base station, $P_{PowerClass}$ is a maximum available terminal power, $\Delta T_C$ is a parameter for allowing additional transmission power relaxation when uplink transmission is performed at an edge of a frequency band.

* * * * *